(12) United States Patent
Acharya

(10) Patent No.: US 7,474,997 B2
(45) Date of Patent: Jan. 6, 2009

(54) CONSTRUCTION AND SELECTION OF A FINITE MIXTURE MODEL FOR USE IN CLUSTERING AND VECTOR QUANTIZATION

(75) Inventor: Chiranjit Acharya, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 573 days.

(21) Appl. No.: 10/825,853

(22) Filed: Apr. 16, 2004

(65) Prior Publication Data

US 2004/0254930 A1    Dec. 16, 2004

Related U.S. Application Data

(60) Provisional application No. 60/463,618, filed on Apr. 16, 2003.

(51) Int. Cl.
*G06F 17/10* (2006.01)
*G06K 9/00* (2006.01)

(52) U.S. Cl. ............... 703/2; 382/159; 382/164; 382/165; 382/181; 382/225; 707/6

(58) Field of Classification Search ............... 703/2; 707/3, 4, 6; 706/17–20, 46; 382/119, 159, 382/164, 165, 181, 182, 224, 225; 704/8
See application file for complete search history.

(56) References Cited

U.S. PATENT DOCUMENTS 6,449,612 B1 * 9/2002 Bradley et al. ............ 707/6

OTHER PUBLICATIONS

Wang et al., Y. Data Mapping by Probabilistic Modular Networks and Information-Theoretic Criteria, IEEE Transactions on Signal Processing, vol. 46, No. 12, Dec. 1998, pp. 3378-3397.*

Langan et al., D.A. Cluster Validation for Unsupervised Stochastic Model-Based Image Segmentation, IEEE Transactios on Image Processing, vol. 7, No. 2 Feb. 1998, pp. 180-195.*

Wang et al., Y. Probabilistic Principal Component Subspaces: A Hierachical Finite Mixture Model for Data Visualization, IEEE Transactions on Neural Networks, vol. 11, No. 3, May 2000, pp. 625-636.*

Li et al., H. Document Classification Using a Finite Mixture MOdel, Proceedings of the 35th Annual Meeting on Association for Computational Linguistics, ACM, Jul. 1997, pp. 39-47.*

Yamanishi, K. A Randomized Approximation of the MDL for Stochastic Models with Hidden Variables, Proceedings of the Ninth Annual Conference on Computational Learning, ACM, Jan. 1996, pp. 99-109.*

Card et al., H.C. Competitive Learning and Vector Quantization in Digital VLSI Systems, Neurocomputing, vol. 18, Iss. 1-3, Jan. 1998, pp. 195-227.*

Ning et al., P. Vector Quantization for Volume Rendering, Proceedings of the 1992 Workshop on Volume Visualization VVS '92, ACM, Dec. 1992, pp. 69-74.*

* cited by examiner

*Primary Examiner*—Russell Frejd
(74) *Attorney, Agent, or Firm*—Blakely, Sokoloff, Taylor & Zafman LLP.

(57) ABSTRACT

A model selection process for selecting a finite mixture model that is suitable for a given task is described. A set of finite mixture models (FMMs) is produced from a set of parameter values and training data for a given task using an Expectation Maximization (EM) process. An FMM from the set of FMMs is selected based on a minimum description length (MDL) value calculated for each of the FMMs.

20 Claims, 7 Drawing Sheets

US 7,474,997 B2

CONSTRUCTION AND SELECTION OF A FINITE MIXTURE MODEL FOR USE IN CLUSTERING AND VECTOR QUANTIZATION

RELATED APPLICATIONS

This application claims the benefit of U.S. Provisional Application No. 60/463,618, filed Apr. 16, 2003.

TECHNICAL FIELD

This invention relates generally to pattern discovery systems, and more particularly to construction and selection of a finite mixture model for use in clustering and vector quantization over multi-dimensional, real-space data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2003, Sony Electronics, Inc., All Rights Reserved.

BACKGROUND

Clustering aims at organizing or indexing a large dataset in the form of a collection of patterns or clusters based on similarity. Each cluster corresponds to a subset of the original dataset. From a probabilistic point of view, this means finding the unknown distribution of datum vectors in a given data set, and the distribution pattern in each cluster is a local component of the global data distribution. The output of cluster analysis answers two main questions: how many clusters there are in the dataset, and how they are distributed in the entire data space. Since correct classification of the data vectors is not known a priori, the goal is simply to find, for the given dataset, the best possible cluster patterns extremizing a predefined objective function. Plausible application areas for clustering are, for example, data mining and pattern recognition, among others well-known in the art.

The purpose of vector quantization is to represent a multi-dimensional dataset by a reduced number of codebook vectors that approximate the original dataset with minimal amount of information loss as possible for the given range of compression factors. Examples of use of vector quantization include data compression, and in that context, the same pattern searching algorithm used in cluster analysis is also applicable in designing a codebook as the concise representation of a large dataset.

Conventional systems that use clustering and vector quantization typically use a predefined input parameter, such as a model complexity parameter, to determine a number of cluster patterns or a number of codebooks to be used in an output for a clustering or vector quantization task respectively. However, the output model will not be suitable for its intended purpose if this input parameter is sub-optimal. For example, a vector quantization task given a less desirable model complexity parameter will not minimize the amount of information loss for a given dataset during a data compression process.

SUMMARY OF AN EMBODIMENT OF THE INVENTION

A model selection process for selecting a finite mixture model that is suitable for a given task is described. A set of finite mixture models (FMMs) is produced from a set of parameter values and training data for a given task using an Expectation Maximization (EM) process. An FMM from the set of FMMs is selected based on a minimum description length (MDL) value calculated for each of the FMMs.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
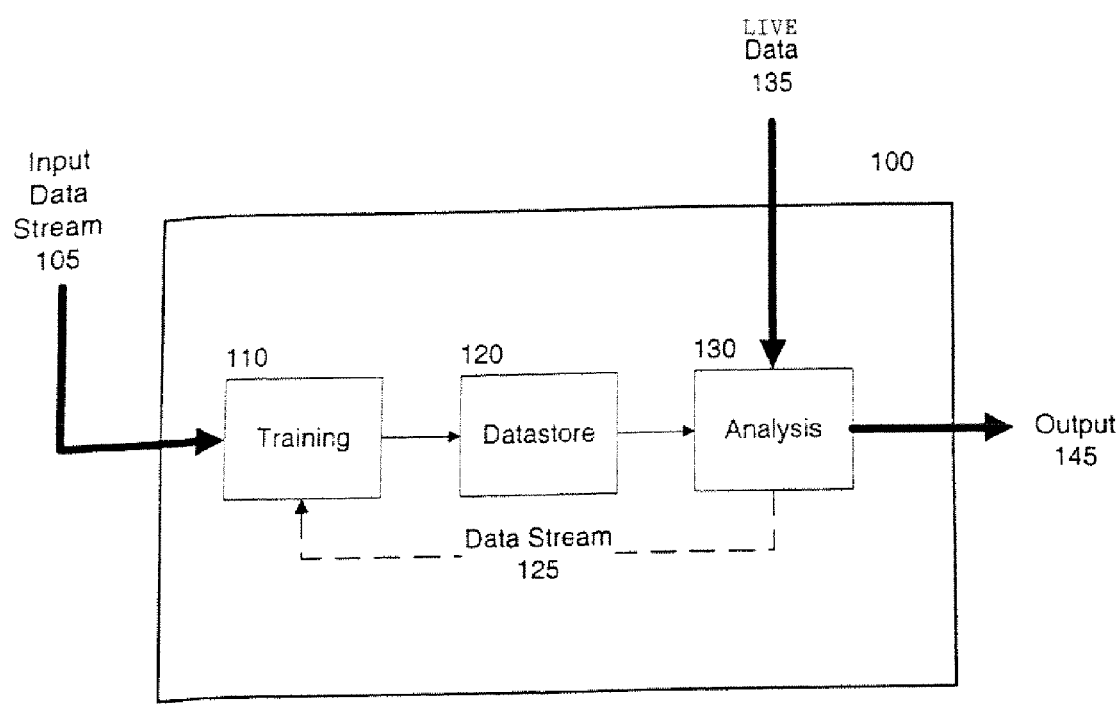
FIG. 1 illustrates one embodiment of a pattern discovery system.

FIG. 1 illustrates a system-level overview of one embodiment of a pattern discovery system 100. The pattern discovery system 100 includes a training module 110, a data storage 120, and an analysis module 130. According to one embodiment, the training module 110 uses a Finite Gaussian Mixture Model and an iterative probabilistic optimization technique, such as an Expectation Maximization (EM) algorithm, for model parameter estimation to generate a model (e.g., a finite mixture model) that is optimized for a specific task (e.g. vector quantization, clustering, etc.). In one embodiment, the EM algorithm uses a set of model-complexity parameter values (e.g., a set of k values) to generate a set of finite mixture models. A finite mixture model (FMM) is a mathematical abstraction of an underlying data-generating process with k number of component probability distributions. In one embodiment, a penalized likelihood method, which is primarily based on a Minimum Description Length (MDL) principle, is used to determine a value of k with respect to a dataset D. The determined value of k with respect to the dataset D is used to select the FMM from a set of constructed FMMs as will be further described below.

An input data stream 105 to the training module 110 may include one or more data streams interfacing with the pattern discovery system 100. In one embodiment, one or more input ports may interface the one or more data streams with the training module 110. Furthermore, the training module 110 may receive data to train the training module 110 from the data memory 120 via a data stream 125.

The data storage 120 may store the FMMs, the MDL values, and the set of k values, among other data. The data storage 120 may include random access memory, dynamic memory, flash memory, as well as more permanent data storage devices, such as a magnetic storage device, an optic storage device and other storage devices well known to those of ordinary skill in the art.

The analysis module 130, in one embodiment, receives one of the FMMs from the data storage 120 and uses live data provided by data stream 135 to output, model data based on a type of learning task (e.g., vector quantization, clustering, etc.). In this fashion, the pattern discovery system 100 uses an extended variant of stochastic complexity as an objective function for finding, for example, a number of codebooks or clusters. In one embodiment, the model data is output via one or more output ports to output 145.

In one embodiment of the invention assume the dataset $D=\{d_1, d_2, \ldots, d_m\}$ is a sample of m independently-and-identically distributed, real-space datum vectors where the underlying data space is a subset of $R^n$. To represent the data-generating process for computational purposes, a finite mixture model M, a mathematical abstraction with k component probability distributions, is introduced, from which the process samples the data. In one embodiment, each component distribution is assumed to be a Gaussian density function, $f$, with mean vector $\mu$, and covariance matrix $\Sigma$:

$$f(x|\mu, \Sigma) = \frac{1}{\sqrt{(2\pi)^n |\Sigma|}} \exp\left(-\frac{1}{2}(x-\mu)^T \Sigma^{-1} (x-\mu)\right) \quad (1)$$

In this embodiment, every component $f$ has a specific relative weight, $\alpha$, associated with it. So the set of component distributions are denoted by the parameter set:

$$\Psi_M = \{\alpha_1, \alpha_2, \ldots, \alpha_k, \mu_1, \mu_2, \ldots, \mu_k, \Sigma_1, \Sigma_2, \ldots, \Sigma_k\}, \quad (2)$$

and the process model of the data generating mechanism can be represented by the probability distribution $P(d|\Psi_M)$ which is a linear combination of component densities:

$$P(d|\Psi_M) = \sum_{c=1}^{k} \alpha_c f(d|\mu_c, \Sigma_c). \quad (3)$$

Under normalization constraint, $0 < \alpha_c < 1$ for $c = 1 \ldots k$, and $$\sum_{c=1}^{k} \alpha_c = 1.$$

This means that every datum vector may belong to multiple components or clusters with different probabilities. Therefore, in the context of vector quantization, a codebook for dataset D will be a set of first moments or mean vectors of the mixture model, $\{\mu_1, \mu_2, \ldots \mu_k\}$. Whereas in the context of clustering, D will have k patterns in data distribution, each pattern being represented as a weighted Gaussian density function: $\{\alpha_i, \mu_i, \Sigma_i\}$.

For convenience in data analysis, an indicator vector $z_i = [z_{i1}, z_{i2}, \ldots z_{ik}]$ is introduced for every data vector $d_i \in D$, where $z_{ij} = 1$ or 0 depending on whether $d_i$ is generated from the j-th distribution component or not. If $Z = \{z_1, z_2, \ldots z_m\}$ is provided along with D, the learning task is to induce a classifier to predict class labels for new data. If Z is not provided along with D, the learning task is to discover the underlying set of classes from the dataset. The focus of the following description is on the second type learning task, that is, automatic discovery of cluster components and corresponding distributions in the context of clustering, and automatic discovery of codebook in the context of vector quantization.

In one embodiment, the data vectors are all identically distributed, and generated independently, therefore the likelihood of D for the given parameterized model $\Psi_M$ is:

$$P(d|\Psi_M) = \prod_{i=1}^{m} P(d_i|\Psi_M). \quad (4)$$

In a maximum-likelihood setting, the model parameters are estimated by maximizing the objective function which is the factored likelihood function or its logarithm:

$$\hat{\Psi}_M = \operatorname{argmax}_\Psi P(D|\Psi_M) \approx \operatorname{argmax}_\Psi \log P(D|\Psi_M) \quad (5)$$

Sometimes the structure of the likelihood function is so complex, that it is analytically intractable to estimate the model parameters by straight-forward log-likelihood maximization. In that case, the requirement is to simplify the structure of the objective function by introducing a set of suitable latent variables. In cluster identification problems, Z is the intended latent variable set, which, in conjunction with the observed data set D, form the complete dataset for likelihood analysis, for which the seed of the objective function is the complete-data likelihood, $P(D,Z|\Psi_M)$.

Figure 2:
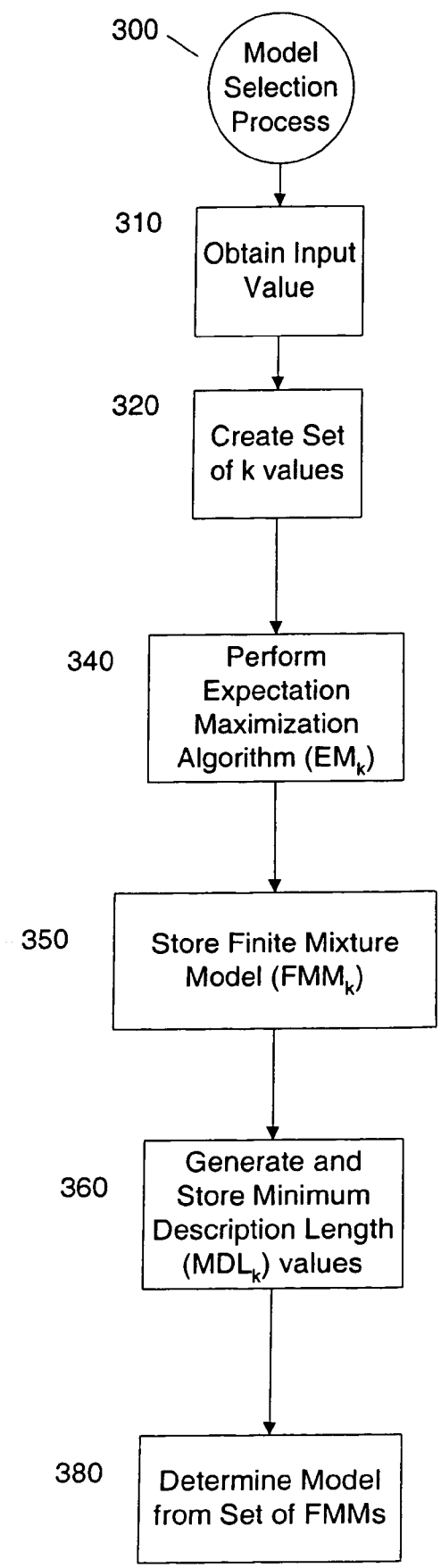
FIG. 2 illustrates one embodiment of a model selection process flow.

FIG. 2 illustrates one embodiment of a model selection process flow 300 used by the pattern discovery system 100 for selecting a model from a set of FMMs. At block 310, the training module 110 obtains an input value. The input value may be specified as a range of values or a percentage derivation from a default value based on whether the learning task is for vector quantization or clustering, among other examples. At block 320, the training module 110 creates a set of model-complexity values (e.g., a set of k values) based on the input value. For example, in vector quantization, the model-complexity values may be derived from a range of potential compression ratios, and in cluster analysis, model complexity values are directly obtained from the pattern-set cardinalities in a range of potential cluster patterns.

At block 340, the training module 110 performs an EM process for each of the set of values. The EM algorithm is a parameter estimation technique that is applied for estimating the parameters of the finite mixture model. An example of the EM process is further described below and in conjunction with FIGS. 3A, 3B, and 3C.

At block 350, the training module 110 stores a set of FMMs generated from the EM process of block 340. At block 360, the training module 110 calculates and stores a set of MDL values for each of the FMMs. At block 380, the training module 110 selects a model from the set of FMMs. In one embodiment, the training module 110 selects a model that is associated with the MDL that has the smallest value, as will be further described in conjunction with FIG. 4 below. Once the model is selected from the set of FMMs, the remaining FMMs may be removed from the data storage 120.

It is understood that the model selection process 300 is not limited to the process flow as shown in FIG. 2. Rather alternative process flows may be implemented, such as a process flow in which blocks 340, 350, and 360 loop in an iterative process for each value of k, among other implementation designs well known to those of ordinary skill in the art.

It is also understood that, in one embodiment, the calculation of the MDL values at block 360 performs hypothesis induction by seeking a model that enables a compact encoding of both parameters and data. For a mixture model M with model complexity $K_M$ (a random variable taking any integral value $k \in [k_{min}, k_{max}]$), the marginalized likelihood is:

$$P(D|K_M) = \int d\psi P(\Psi_M | K_M) P(D | K_M, \Psi_M), \quad (6)$$

where $$P(D | K_M, \Psi_M) = \prod_{i=1}^{m} P(d_i | K_M, \Psi_M), \quad (7)$$

and $P(\Psi_M | K_M)$ is the parameter prior.

Following the traditional maximum-likelihood approach, a value for $K_M$ can be obtained by maximizing the marginalized log-likelihood:

$$\hat{K}_M = \operatorname{argmax}_k \log P(D | K_M) \quad (8)$$

Using the MDL principle, the asymptotic approximation of the marginalized log-likelihood under regularity conditions is:

$$\log P(D | K_M) \approx \log P(D | K_M, \Psi_M) - \frac{|\Psi_M|}{2} \log m - \frac{1}{2} \sum_{c=1}^{k} |\Psi_c| \log \alpha_c \quad (9)$$

where $|\Psi_M|$ is the total number of parameters required to specify a finite mixture model with $K_M(=k)$ components, and $|\Psi_c|$ is the number of parameters to define each component. This marginalized log-likelihood leads to the minimization of the following MDL objective function:

$$MDL(\hat{K}_M) = -2\log P(D | K_M, \Psi_M) - \quad (10)$$

$$|\Psi_M| \log m - \sum_{c=1}^{k} |\Psi_c| \log \alpha_c.$$

MDL criterion for model selection may be asymptotically Bayesian.

After the model has been selected with the model selection process 300, the selected model may be used for analysis as previously described for FIG. 1. For example, upon selecting the model, the analysis module 130 may output the mean vectors $\{\mu_1, \mu_2, \ldots \mu_k\}$ as the codebook of D if the learning task is for vector quantization. Furthermore, the analysis module 130 may output $\Psi_M^{(l)}$ (weight, motion vectors, variance) as the final parameter mixture estimate of patterns if the learning task is for clustering.

Furthermore, it is understood that the invention is not limited to the processing of the model selection process 300 described in FIG. 2. Rather one of ordinary skill in the art will recognize that in other embodiments, alternative processes may be used. For example, the following illustrates alternative pseudo-code according to one embodiment:

Set $k \leftarrow k_{\min}; l \leftarrow 1$

While ($k \leq k_{\max}$)

{

Set $\{\alpha_1, \alpha_2, \ldots, \alpha_k\} \leftarrow \{\alpha_1^0, \alpha_2^0, \ldots, \alpha_k^0\}$.

Set $\{\mu_1, \mu_2, \ldots, \mu_k\} \leftarrow \{\mu_1^0, \mu_2^0, \ldots, \mu_k^0\}$.

Set $\{\sum_1, \sum_2, \ldots, \sum_k\} \leftarrow \{\sum_1^0, \sum_2^0, \ldots, \sum_k^0\}$.

Run EM until $\max\{|\mu_j^{(t+1)} - \mu_j^{(t)}|\}_{j=1}^{k} < \varepsilon_\mu$ and $\max\{|\sum_j^{(t+1)} - \sum_j^{(t)}|\}_{j=1}^{k} < \varepsilon_\Sigma$ Set $\Psi_M^{(l)} \leftarrow \{\alpha_1, \alpha_2, \ldots, \alpha_k, \mu_1, \mu_2, \ldots, \mu_k,$ $\sum_1, \sum_2, \ldots, \sum_k\}$.

Set $MDL(\hat{K}_M)^{(l)} \leftarrow MDL(k)$.

Set $k \leftarrow k + 1; l \leftarrow l + 1$.

}

Find $\hat{k} \leftarrow \operatorname{argmin}_k \{MDL(k)\}_{k=k_{\min}}^{k_{\max}}$;

Find $l$ corresponding to $\hat{k}$;

If the task is vector quantization

{

Output $\{\mu_1, \mu_2, \ldots \mu_k\}$ as the codebook of D;

} else

{

Output $\Psi_M^{(l)}$ as the final parameter mixture estimate;

}

In addition, it is understood that the invention is not limited to the EM process as described herewith. Rather one of ordinary skill in the art will recognize that other EM algorithms might be modified to perform similar functions as described herein. For example, the EM process for each of the set of values may be performed in an iterative process. In one embodiment each iteration of the EM process has two steps: an E (Expectation)-step and an M(Maximization)-step. In the E-step, the expected value of $P(D, Z | \Psi_M)$ is computed with respect to the marginal distribution of Z:

$$Q(\Psi_M, \hat{\Psi}_M^{i-1}) = E[\log P(D, Z | \Psi_M) | D,$$
$$\hat{\Psi}_M^{i-1}] = \int dz P(Z | D, \hat{\Psi}_M^{i-1}) \log P(D, Z | \Psi_M). \quad (11)$$

In the Q function, $P(Z | D, \hat{\Psi}_M^{i-1})$ is the marginal distribution of the latent variables, which is dependent on the observed data and the most recent estimate of the model parameters.

In the M-step, the Q function is maximized to obtain the new estimate of $\Psi_M$ for the next iteration:

$$\hat{\Psi}_M^i = \operatorname{argmax}_\psi Q(\Psi_M, \hat{\Psi}_M^{i-1}) \quad (12)$$

$\hat{\Psi}_M^i$, as computed in the M-step, is applied in the next E-step, and the EM algorithm continues until the predefined termination criteria is met. In each iteration, log-likelihood is increased monotonically, and the algorithm is guaranteed to converge to local maxima of the likelihood function.

For the incomplete dataset D, the log-likelihood will be:

$$L(\Psi_M \mid D) = \log P(D \mid \Psi_M) \quad (13)$$

$$= \log \prod_{i=1}^{m} P(d_i \mid \Psi_M)$$

$$= \sum_{i=1}^{m} \log \sum_{c=1}^{k} \alpha_c f(d_i \mid \mu_c, \Sigma_c)$$

$L(\Psi_M)$, in its current functional form, is difficult for optimization. It can be simplified by introducing the latent class-indicator variable set, Z. For every complete datum vector ($d_i$, $z_i$), corresponding likelihood probability under finite Gaussian mixture model assumption will be:

$$P(d_i, z_i \mid \Psi_M) = \prod_{c=1}^{k} \alpha_c^{z_{ic}} f(d_i \mid \mu_c, \Sigma_c)^{z_{ic}} \quad (14)$$

Following equation (14), the complete-data log-likelihood will be:

$$L(\Psi_M \mid D, Z) = \log P(D, Z \mid \Psi_M) \quad (15)$$

$$= \log \prod_{i=1}^{m} P(d_i, z_i \mid \Psi_M)$$

$$= \sum_{i=1}^{m} \sum_{c=1}^{k} z_{ic} \log[\alpha_c f(d_i \mid \mu_c, \Sigma_c)]$$

EM algorithm iterates over this objective function, computing alternately the expected values of Z and $\Psi_M$.

Figure 3A:
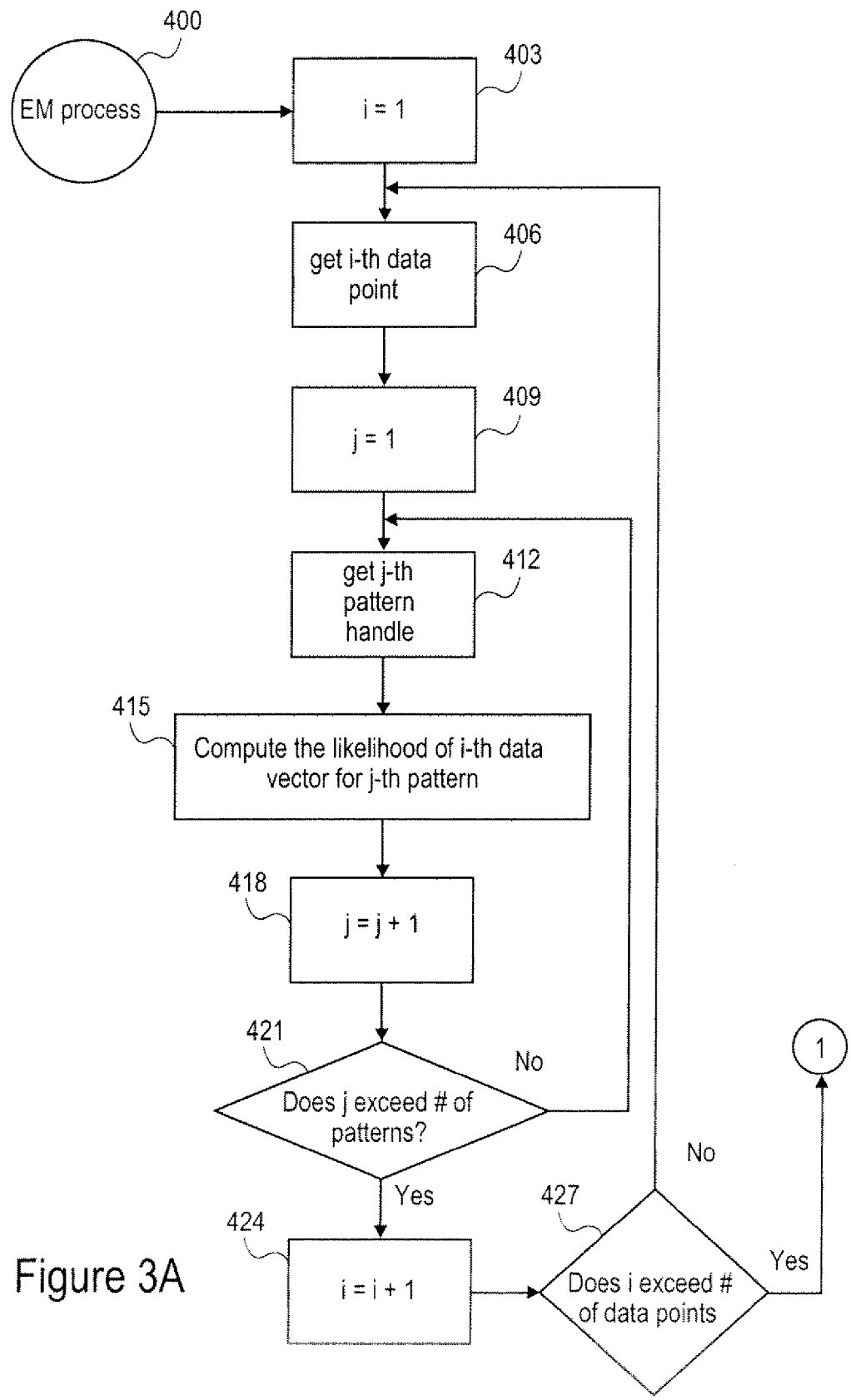
FIGS. 3A, 3B, and 3C illustrate one embodiment of an expectation maximization process flow.
Figure 3B:
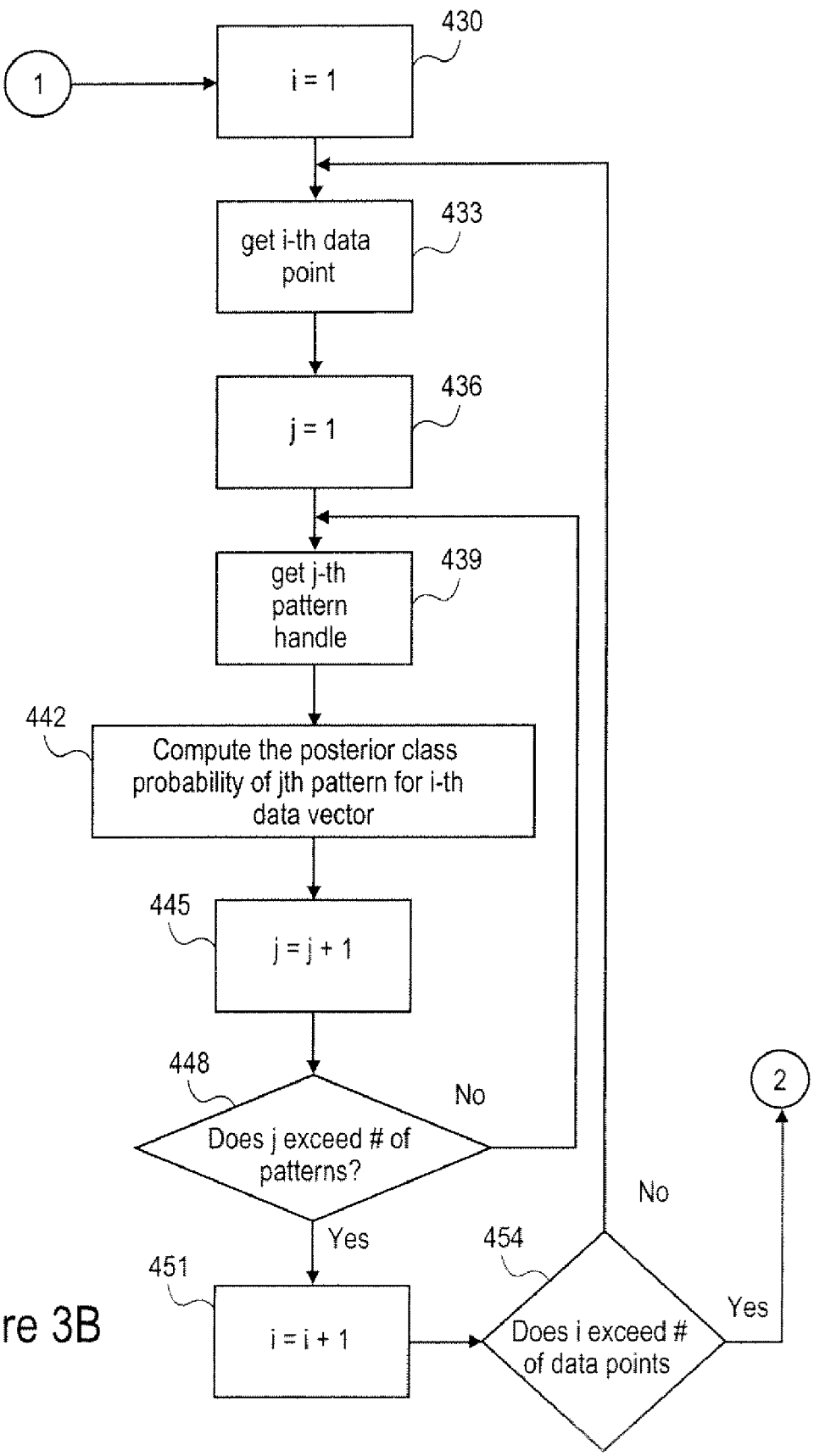
Figure 3C:
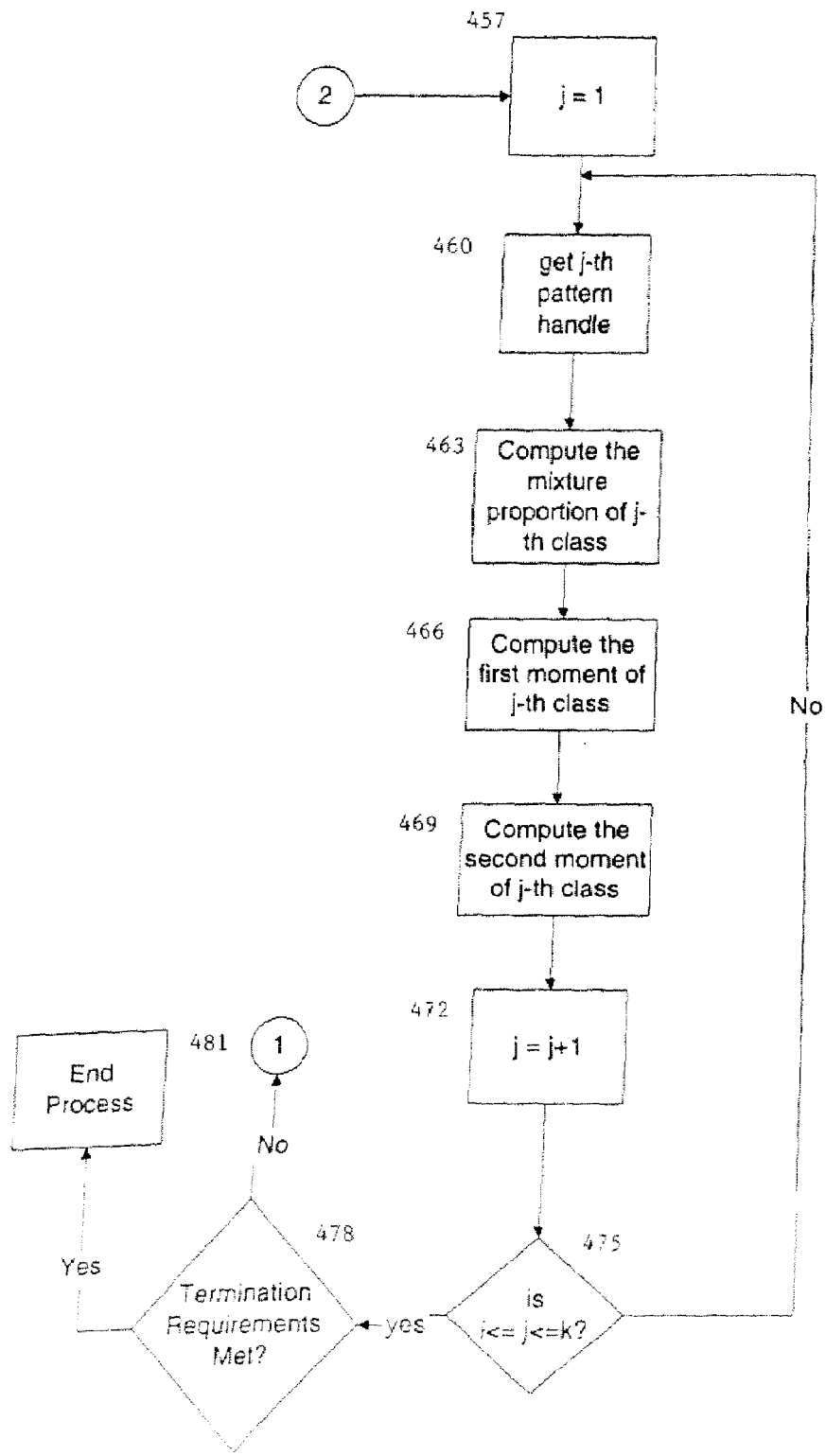

FIGS. 3A, 3B, and 3C illustrate one embodiment of an EM process flow 400 for performing the EM process described in conjunction with block 340 above. Assuming the k density components of the mixture model are denoted as $C_1$, $C_2$, ..., $C_k$, the EM process flow 400 will proceed in the following way. At block 403, the training module 110 sets a value i to one. At block 406, the training module 110 receives the i-th data point. At block 409, the training module 110 sets a j value to one. At block 412, the training module 110 receives the j-th pattern handle. At block 415, the training module 110 computes the likelihood of the i-th data vector for the j-th pattern. In this fashion, the class-conditional likelihood probability of every i-th datum vector for every j-th latent class, $P(d_i | C_j, \Psi_M)$, is computed. At block 418, the training module 110 increments the j value by one. At block 421, the training module 110 determines whether the current j value exceeds the number of patterns. If the training module 110 determines the current j value exceeds the number of patterns, control passes to block 424. If the training module 110 determines the current j value does not exceed the number of patterns, control returns to block 412 and the process flow continues as described above.

At block 424, the training module 110 increments the i value by 1. At block 427, the training module 110 determines whether the i value exceeds the number of data points. If the training module 110 determines the i value exceeds the number of data points, control passes to block 430. If the training module 110 determines the i value does not exceed the number of data points, control returns to block 406 and the process flow continues as described above.

At block 430, the training module 110 sets the i value to one. At block 433, the training module 110 receives the i-th data point. At block 436, the training module 110 sets the j value to one. At block 439, the training module 110 receives the j-th pattern handle. At block 442, the training module 110 computes the posterior class probability of the j-th pattern for the i-th data vector. In this fashion, the posterior class probability of every j-th latent class with respect to every i-th datum vector, $P(C_j | d_i, \Psi_M)$, is computed. At block 445, the training module 110 increments the j value by one. At block 448, the training module 110 determines whether j exceeds the number of patterns. If the training module 110 determines the j value exceeds the number of patterns, control passes to block 451. If the training module 110 determines the j value does not exceed the number of patterns, control returns to block 439 and the process flow continues as described above.

At block 451, the training module 110 increments the i value by one. At block 454, the training module 110 determines whether the i value exceeds the number of data points. If the training module 110 determines the i value exceeds the number of data points, control passes to block 457. If the training module 110 determines the i value does not exceed the number of data points, control returns to block 433 and the process flow continues as described above.

At block 457, the training module 110 sets the j value to 1. At block 460, the training module 110 receives the j-th pattern handle. At block 463, the training module 110 computes the mixture proportion of the j-th class. At block 466, the training module 110 computes a first moment of the j-th class. At block 469, the training module 110 computes a second moment of the j-th class. Therefore, based on the statistics provided by the probability distributions at each EM iteration, parameters of all the mixture components, $\{\alpha_j, \mu_j, \Sigma_j\}_{j=1}^{k}$, are computed.

At block 472, the training module 110 increments the j value by one. At block 475, the training module 110 determines whether the i value is less than or equal to the j value; and whether the j value is less than or equal to the k value. If the training module 110 determines the i value is less than or equal to the j value; and the j value is less than or equal to the k value, control passes to block 478. If the training module 110 determines the i value is not less than or equal to the j value; or the j value is not less than or equal to the k value, control returns to block 460 and the process flow continues as described above.

At block 478, the training module 110 determines whether a termination criteria is met. If the training module 110 determines the termination criteria is met, control passes to block 481 and the process flow 400 ends. If the training module 110 determines the termination requirement is not met, control returns to block 430 and the process flow continues as described above. In one embodiment, the termination criteria of every EM run will be based on some pre-defined error margin on first and second moments of Gaussian densities:

$$\max\{|\mu_j^{(t+1)} - \mu_j^{(t)}|\}_{j=1}^{k} < \epsilon_\mu \quad \text{and} \quad \max\{|\Sigma_j^{(t+1)} - \Sigma_j^{(t)}|\}_{j=1}^{k} < \epsilon_\Sigma \quad (14)$$

In one embodiment, the following pseudo-code illustrates the complete EM optimization for a given model complexity $\hat{K}_M = k$ as follows:

Set t ← 0;
Repeat
{
    for (i = 1 to m)
    {
        for(j = 1 to k)
        {

$$P(d_i|C_j, \Psi_M)^{(t+1)} = P\left(d_i|\hat{\mu}_j^{(t)}, \hat{\sum}_j^{(t)}\right);$$

}
    }
    for(i = 1 to m)
    {
        for (j = 1 to k)
        {

$$P(C_j|d_i, \Psi_M)^{(t+1)} = \frac{\alpha_j^{(t)} P(d_i|C_j, \Psi_M)^{(t+1)}}{\sum_{c=1}^{k} \alpha_c^{(t)} P(d_i|C_c, \Psi_M)^{(t+1)}};$$

}
    }
    for(j = 1 to k)
    {

$$\alpha_j^{(t+1)} = \sum_{i=1}^{m} P(C_j|d_i, \Psi_M)^{(t+1)};$$

$$\mu_j^{(t+1)} = \frac{1}{\alpha_j^{(t+1)}} \sum_{i=1}^{m} P(C_j|d_i, \Psi_M)^{(t+1)} d_i;$$

$$\sum_j^{(t+1)} = \frac{1}{\alpha_j^{(t+1)}} \sum_{i=1}^{m} P(C_j|d_i, \Psi_M)^{(t+1)} (d_i - \mu_j^{(t+1)})(d_i - \mu_j^{(t+1)})^T$$

}
    Set t ← t + 1;
}

Figure 4:
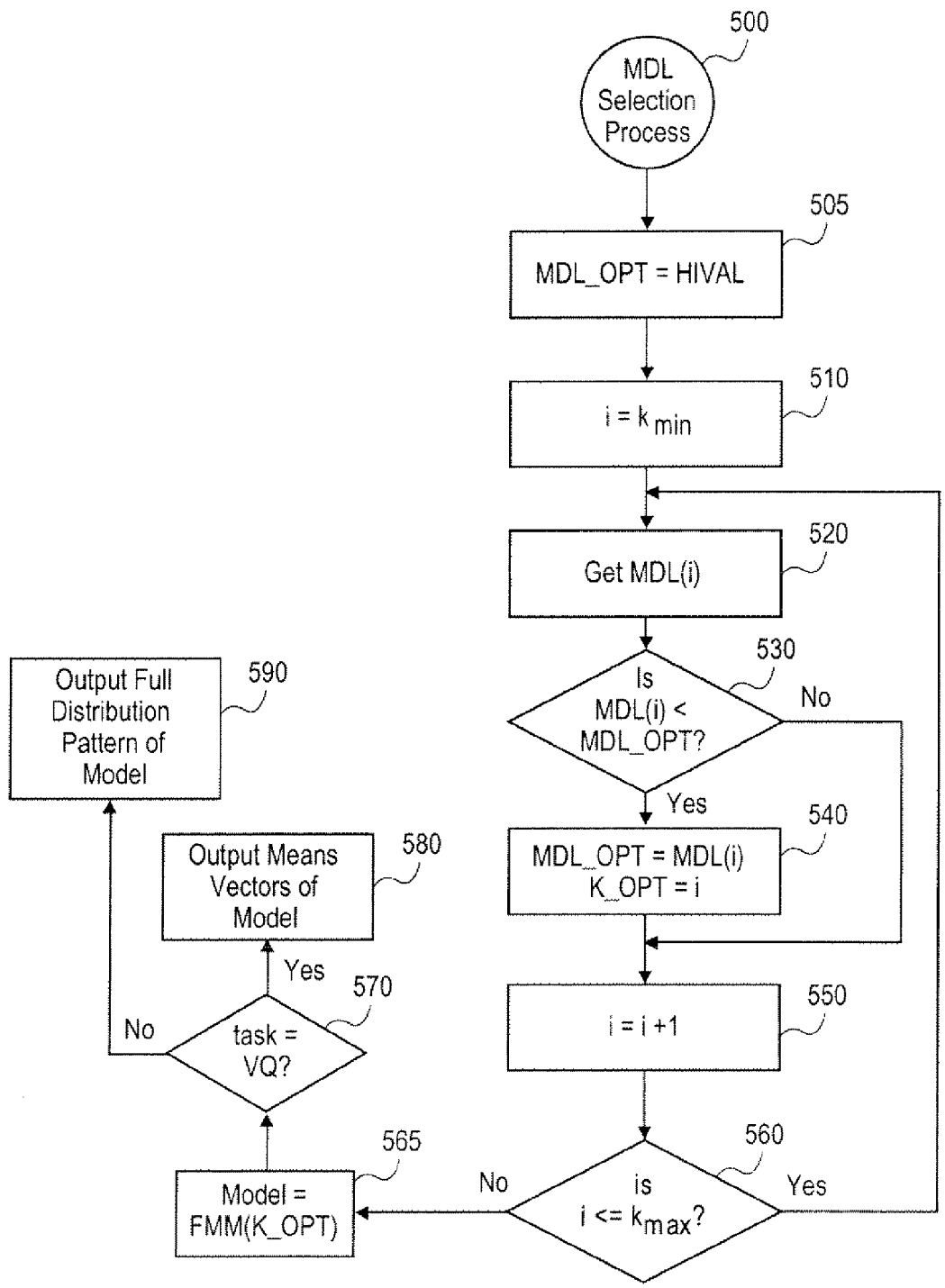
FIG. 4 illustrates one embodiment of a model description length selection process flow.

Until $\max\{\|\mu_j^{(t+1)} - \mu_j^{(t)}\|\}_{j=1}^{k} < \varepsilon_\mu$ and $\max\left\{\left\|\sum_j^{(t+1)} - \sum_j^{(t)}\right\|\right\}_{j=1}^{k} < \varepsilon_\Sigma$ FIG. 4 illustrates one embodiment of MDL Selection process flow 500 for selecting a model from the set of FMMs. At block 505, the training module 110 sets the MDL_OPT value to an arbitrary high value. At block 510, the training module 110 sets an i value to a minimum k value. At block 520, the training module 110 receives an MDL value associated with the current i value. At block 530, the training module 110 determines whether the MDL value is less than the MDL_OPT value. If the training module 110 determines the MDL value is less than the MDL_OPT value, control passes to block 540. If the training module 110 determines the MDL value is not less than the MDL_OPT value, control passes to block 550.

At block 540, the training module 110 sets the MDL_OPT value to the MDL value associated with the current i value. The training module 110 also sets a K_OPT value to the current i value, where MDL(K_OPT) is the smallest MDL value.

At block 550, the training module 110 increments the i value by one. At block 560, the training module 110 determines whether the i value is less than or equal to the maximum value of k. If the training module 110 determines the i value is less than or equal to the maximum value of k, control returns to block 520. If the training module 110 determines the i value is not less than or equal to the maximum value of k, control passes to block 565.

At block 565, the training module selects FMM($K_{13}$ OPT) from the set of FMMs. In this fashion, the training module 110 selects the FMM from the set of FMMs for which model complexity equals K_OPT.

At block 570, the training module 110 determines whether the task is a vector quantization task. If the training module 110 determines the task is a vector quantization task, control passes to block 580. If the training module 110 determines the task is not a vector quantization task but a clustering task, control passes to block 590.

At block 580, the training module 110 outputs means vectors as the codebook of D. At block 590, the training module 110 outputs a full distribution model as the final parameter mixture estimate that will be interpreted as the set of discovered cluster patterns.

Figure 5:
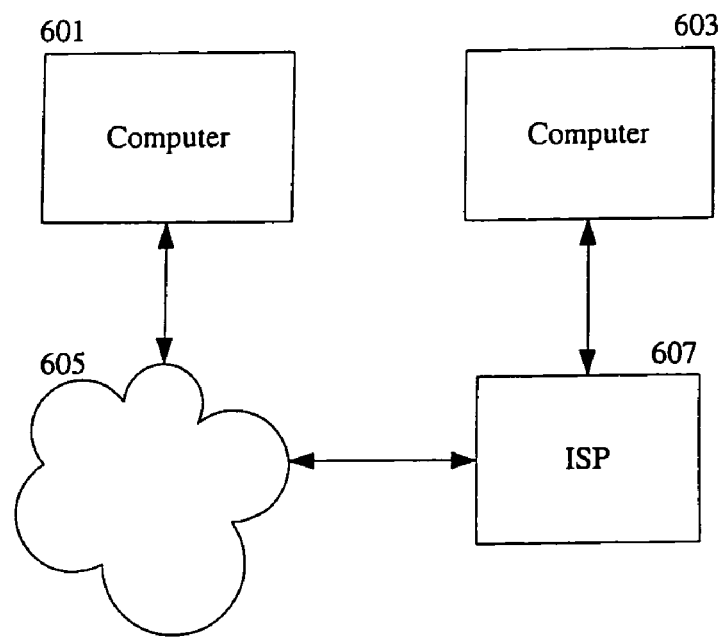
FIG. 5 illustrates a network environment suitable for practicing the invention.

In one embodiment, as shown in FIG. 5, a computer 601 is part of, or coupled to a network 605, such as the Internet, to exchange data with another computer 603, as either a client or a server computer. Typically, a computer couples to the Internet through an ISP (Internet Service Provider) 607 and executes a conventional Internet browsing application to exchange data with a server. Other types of applications allow clients to exchange data through the network 605 without using a server. It is readily apparent that the present invention is not limited to use with the Internet; directly coupled and private networks are also contemplated.

Figure 6:
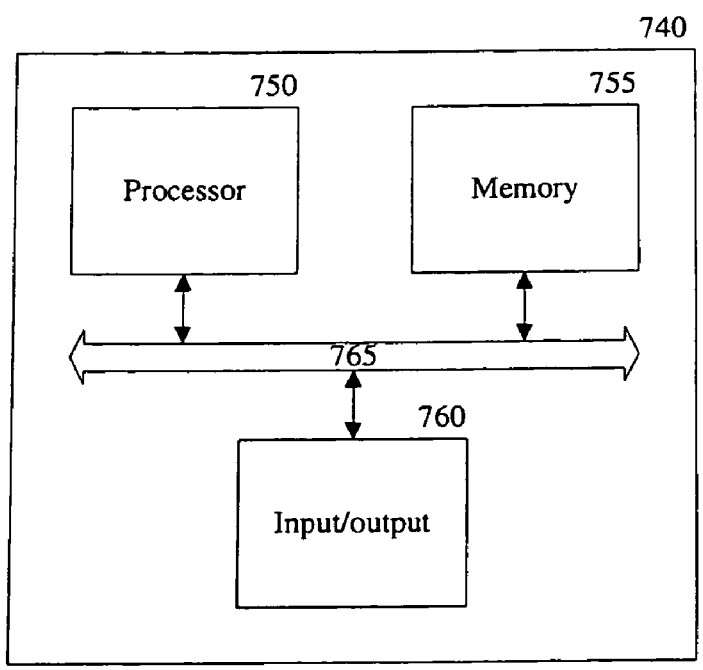
FIG. 6 illustrates a computer system suitable for practicing the invention.

One embodiment of a system 740 suitable for use in the environments of FIG. 5 is illustrated in FIG. 6. The system 740 includes a processor 750, memory 755 and input/output capability 760 coupled to a system bus 765. The memory 755 is configured to store instructions which, when executed by the processor 750, perform the methods described herein. The memory 755 may also store data such as the set of FMM and the set of values. Input/output 760 provides for the delivery and display of the data or portions or representations thereof. Input/output 760 also encompasses various types of machine or computer-readable media, including any type of storage device that is accessible by the processor 750. It will also be appreciated that the computer is controlled by operating system software executing in memory 755. Input/output and related media 760 store the machine/computer-executable instructions for the operating system and methods of the present invention as well as the set of FMMs and the set of values.

The description of FIGS. 5 and 6 is intended to provide an overview of computer hardware and various operating environments suitable for implementing the invention, but is not intended to limit the applicable environments. It will be appreciated that the system 740 is one example of many possible devices that have different architectures. A typical device will usually include at least a processor, memory, and a bus coupling the memory to the processor. Such a configuration encompasses personal computer systems, network computers, television-based systems, such as Web TVs or set-top boxes, handheld devices, such as cell phones and personal digital assistants, and similar devices. One of skill in the art will immediately appreciate that the invention can be practiced with other system configurations, including multiprocessor systems, minicomputers, mainframe computers, and the like. The invention can also be practiced in distributed computing environments where tasks are performed by remote processing devices that are linked through a communications network.

It will be appreciated that more or fewer processes may be incorporated into the methods illustrated in FIGS. 2, 3A, 3B, 3C, and 4 without departing from the scope of the invention and that no particular order is implied by the arrangement of blocks shown and described herein. Describing the methods by reference to a flow diagram enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc), as taking an action or causing a result. Such expressions are merely a shorthand way of saying that execution of the software by a computer causes the processor of the computer to perform an action or produce a result.

A model selection process has been described to select a suitable model from a finite set of FMMs. Furthermore, a dynamic model-complexity parameter, which is not pre-defined but is determined through a learning process, has also been described, to select the model. It is understood that the model selected by the pattern discovery system 100 may be used with data for in fields such as financial investment, data mining, pattern recognition (e.g., voice recognition, handwriting recognition, etc.), texture and image segmentation, boundary detection and surface approximation, magnetic resonance imaging, handwritten character recognition, computer vision, and information retrieval among other applications well known to those of ordinary skill in the art.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computerized method comprising:
    producing a set of finite mixture models (FMM)s from a set of parameter values and training data using an Expectation Maximization (EM) process;
    calculating a minimum description length (MDL) value for each of the set of FMMs;
    selecting a FMM from the set of FMMs based on the corresponding MDL values; and
    generating a quantized stream of data by applying the FMM to a data stream if the FMM selected from the set of FMMs defines a vector quantized codebook.

2. The method of claim 1, wherein each parameter value is a model-complexity parameter for the EM process.

3. The method of claim 1, wherein selecting comprises selecting the FMM from the set of FMMs corresponding to the MDL having a smallest MDL value.

4. The method of claim 1, further comprising applying the FMM selected from the set of FMMs to cluster a stream of data.

5. The method of claim 4, wherein the FMM selected from the set of FMMs defines a cluster pattern.

6. A machine-readable storage medium having executable instructions, which when executed, cause a device to perform functions comprising:
    producing a set of finite mixture models (FMM)s from a set of parameter values and training data using an Expectation Maximization (EM) process;
    calculating a minimum description length (MDL) value for each of the set of FMMs;
    selecting a FMM from the set of FMMs based on the corresponding MDL values; and
    generating a quantized stream of data by applying the FMM to a data stream if the FMM selected from the set of FMMs defines a vector quantized codebook.

7. The machine-readable storage medium of claim 6, wherein each parameter value is a model-complexity parameter for the EM process.

8. The machine-readable storage medium of claim 6, wherein selecting comprises selecting the FMM from the set of FMMs corresponding the MDL having a smallest MDL value.

9. The machine-readable storage medium of claim 6, wherein the functions further comprise applying the FMM from the set of FMMs to cluster a stream of data.

10. The machine-readable storage medium of claim 9, wherein the FMM selected from the set of FMMs defines a cluster pattern.

11. A system comprising:
    a processor coupled to a memory through a bus; and
    a model selection process executed by the processor from the memory to cause the processor to produce a set of finite mixture models (FMM)s from a set of parameter values and training data using an Expectation Maximization (EM) process, to calculate a minimum description length (MDL) value for each of the set of FMMs, to select a FMM from the set of FMMs based on the corresponding MDL values, and to generate a quantized stream of data by applying the FMM to a data stream if the FMM selected from the set of FMMs defines a vector quantized codebook.

12. The system of claim 11, wherein each parameter value is a model-complexity parameter for the EM process.

13. The system of claim 11, wherein the model selection process further causes the processor, when selecting, to select the FMM from the set of FMMs corresponding to the MDL having a smallest value.

14. The system of claim 11, wherein the model selection process further causes the processor to apply the FMM selected from the set of FMMs to cluster a stream of data.

15. The system of claim 14, wherein the FMM selected from the set of FMMs defines a cluster pattern.

16. An apparatus comprising:
    means for producing a set of finite mixture models (FMM)s from a set of parameter values and training data using an Expectation Maximization (EM) process;
    means for calculating a minimum description length (MDL) value for each of the set of FMMs;
    means for selecting a FMM from the set of FMMs based on the corresponding MDL values; and
    means for generating a quantized stream of data by applying the FMM to a data stream if the FMM selected from the set of FMMs defines a vector quantized codebook.

17. The apparatus of claim 16, wherein each parameter value is a model-complexity parameter for the EM process.

18. The apparatus of claim 16, wherein the means for selecting comprises means for selecting the FMM from the set of FMMs corresponding to the MDL having a smallest MDL value.

19. The apparatus of claim 16, further comprising a means for applying the FMM selected from the set of FMMs to cluster a stream of data.

20. The apparatus of claim 19, wherein the FMM selected from the set of FMMs defines a cluster pattern.

* * * * *